US011009010B1

(12) United States Patent
Saavedra (10) Patent No.: US 11,009,010 B1
(45) Date of Patent: May 18, 2021

(54) WIND-POWERED ELECTRIC GENERATOR WITH BASE-MOUNTED GENERATOR

(71) Applicant: Look for the Power, LLC, Irmo, SC (US)

(72) Inventor: John A. Saavedra, Irmo, SC (US)

(73) Assignee: LOOK FOR THE POWER, LLC, Irmo, SC (US)

( * ) Notice: Subject to any disclaimer, the term of this patent is extended or adjusted under 35 U.S.C. 154(b) by 0 days.

(21) Appl. No.: 16/854,722

(22) Filed: Apr. 21, 2020

(51) Int. Cl.
*F03D 15/00* (2016.01)
*F03D 9/32* (2016.01)
*F03D 9/25* (2016.01)
*F03D 1/06* (2006.01)

(52) U.S. Cl.
CPC ............. *F03D 15/00* (2016.05); *F03D 9/25* (2016.05); *F03D 9/32* (2016.05); *F03D 1/06* (2013.01)

(58) Field of Classification Search
CPC ..... F03D 1/06; F03D 9/25; F03D 9/32; F03D 15/00
USPC ..................................... 290/44, 55
See application file for complete search history.

(56) References Cited

U.S. PATENT DOCUMENTS

| | | | | |
|---|---|---|---|---|
| 508,009 A * | 11/1893 | George | ................ | F03D 1/00 416/124 |
| 1,633,460 A * | 6/1927 | Silvestrin | ................ | F03D 13/20 416/150 |
| 2,539,862 A * | 1/1951 | Rushing | ................ | F03D 9/18 62/230 |
| 3,942,026 A * | 3/1976 | Carter | ................ | F03D 13/20 290/55 |
| 3,944,839 A * | 3/1976 | Carter | ................ | F03D 1/025 290/55 |
| 4,068,131 A * | 1/1978 | Jacobs | ................ | F03D 7/0224 290/55 |
| 4,113,408 A * | 9/1978 | Wurtz | ................ | F03D 3/068 416/117 |
| 4,171,491 A * | 10/1979 | Theyse | ................ | H02J 1/16 290/1 R |
| 4,186,312 A * | 1/1980 | Dvorak | ................ | F03B 15/06 290/4 R |
| 4,303,835 A * | 12/1981 | Bair | ................ | F03D 3/068 290/44 |
| 4,311,435 A * | 1/1982 | Bergero | ................ | F03D 15/00 416/170 R |
| 4,613,760 A * | 9/1986 | Law | ................ | H02J 3/40 290/1 C |
| 5,669,758 A * | 9/1997 | Williamson | ................ | F03D 1/04 416/4 |
| 7,156,586 B2 * | 1/2007 | Nim | ................ | B63B 35/44 405/195.1 |

(Continued)

*Primary Examiner* — Pedro J Cuevas
(74) *Attorney, Agent, or Firm* — Shumaker, Loop & Kendrick, LLP (57) ABSTRACT

Horizontal axis wind turbines are provided that have a rotor including a hub having at least one blade extending therefrom. A first rotatable member is coupled to the rotor and configured to rotate in relation to wind-induced rotation of the rotor. A tower supports the rotor and has a base. A second rotatable member is spaced from the first rotatable member toward the base of the tower. An endless member engages the first rotatable member and the second rotatable member to convey a rotational force therebetween. An electrical generator is coupled to the second rotatable member.

17 Claims, 2 Drawing Sheets

(56) References Cited

U.S. PATENT DOCUMENTS

| | | | |
|---|---|---|---|
| 7,215,037 B2 * | 5/2007 | Scalzi | B60L 8/00 290/55 |
| 7,789,793 B2 * | 9/2010 | Koleoglou | F03D 9/25 475/344 |
| 7,948,101 B2 * | 5/2011 | Burtch | F03D 9/008 290/44 |
| 8,178,991 B2 * | 5/2012 | Smith | F03D 9/25 290/55 |
| 8,212,374 B2 * | 7/2012 | Wang | F03D 15/10 290/55 |
| 8,247,918 B2 * | 8/2012 | Smith | F03D 9/25 290/44 |
| 8,253,268 B1 * | 8/2012 | Smith | F03D 7/0276 290/55 |
| 8,482,147 B2 * | 7/2013 | Moser | F03D 7/0224 290/55 |
| 8,482,150 B2 * | 7/2013 | Smith | F03D 1/0608 290/55 |
| 8,517,669 B2 * | 8/2013 | Dotts, III | F03D 9/25 415/122.1 |
| 8,541,897 B2 * | 9/2013 | Khoshnevis | F03D 3/02 290/44 |
| 8,710,694 B2 * | 4/2014 | Smith | F03D 15/10 290/55 |
| 8,836,158 B2 * | 9/2014 | Cho | F03D 15/00 290/55 |
| 9,249,783 B2 * | 2/2016 | Selsam | F03D 9/30 |
| 9,617,979 B2 * | 4/2017 | Smith | F03D 15/10 |
| 9,624,903 B2 * | 4/2017 | Coulson | F03D 3/005 |
| 9,702,344 B2 * | 7/2017 | Skaare | B63B 39/062 |
| 10,024,307 B2 * | 7/2018 | Selsam | F03D 15/20 |
| 10,087,913 B2 * | 10/2018 | Nielsen | F03D 7/0224 |
| 10,518,846 B2 * | 12/2019 | Dagher | F03D 1/06 |
| 2006/0151664 A1 * | 7/2006 | Yu | F03D 9/32 244/4 R |
| 2006/0165493 A1 * | 7/2006 | Nim | F03D 13/22 405/223.1 |
| 2008/0231053 A1 * | 9/2008 | Burtch | F03D 15/20 290/52 |
| 2009/0035134 A1 * | 2/2009 | Kuo | F03D 3/068 416/119 |
| 2010/0111697 A1 * | 5/2010 | Wood | F03D 1/04 416/128 |
| 2011/0018269 A1 * | 1/2011 | Moser | F03D 15/10 290/44 |
| 2011/0223017 A1 * | 9/2011 | Smith | F03D 80/70 416/1 |
| 2012/0098265 A1 * | 4/2012 | Skaare | F03D 7/042 290/53 |
| 2012/0190497 A1 * | 7/2012 | Smith | F03D 9/25 476/57 |
| 2012/0217753 A1 * | 8/2012 | Smith | F03D 1/025 290/55 |
| 2012/0286519 A1 * | 11/2012 | Yoon | F03D 15/00 290/55 |
| 2013/0168968 A1 * | 7/2013 | Dong | F03D 15/00 290/55 |
| 2014/0035287 A1 * | 2/2014 | Smith | F03D 7/0276 290/55 |
| 2015/0115614 A1 * | 4/2015 | Smith | F03D 9/25 290/1 C |
| 2015/0354532 A1 * | 12/2015 | Nielsen | F03D 13/25 416/9 |
| 2016/0341182 A1 * | 11/2016 | Dagher | B63B 75/00 |
| 2020/0217297 A1 * | 7/2020 | Hossain | F03D 15/00 |

* cited by examiner

WIND-POWERED ELECTRIC GENERATOR WITH BASE-MOUNTED GENERATOR

FIELD

The present technology relates to a wind turbine, including a horizontal axis wind turbine that transfers wind power to a base-mounted generator.

INTRODUCTION

This section provides background information related to the present disclosure which is not necessarily prior art.

As worldwide energy needs increase, so does the demand for clean, renewable, sustainable, non-polluting energy sources that are inexpensive, widely available, easily harvested, and that can operate day and night, summer and winter, in foul or fair weather. Though developed centuries ago, wind-powered devices are still a favored source of power generation today. The windmill, once used to grind grain, has been adapted to produce electricity. Windmills have evolved into wind turbines where the power of the wind no longer turns stone wheels atop grain, but rather passes magnets alongside wire coils to generate electricity. In wind turbines, the force of the wind pushes the blades of a wheel which act as the rotor of a generator. The use of wind to power a turbine, rotor, and electrical generator has been practiced for more than a century. As the need for energy has increased, so has the size and number of wind turbines.

Wind turbines have been developed to work more efficiently in compensating for many of the natural obstacles impeding consistent energy recovery from the wind. For example, shifts in wind direction can stop a fixed wind turbine; thus, wind turbines have been constructed with various rotational methods so that the wind will strike the blade in the optimum fashion. Further, wind turbines have been developed whereby fluctuations in wind velocity leave the wind turbine relatively unaffected in both structural integrity and power generation potential.

Large three-bladed horizontal axis wind turbines, where the blades are positioned upwind of the tower, produce the overwhelming majority of wind power in the world today as the design has proven efficient in producing electricity from wind. Typically, horizontal axis wind turbines include a large rotor hub and blades that drive a rotor shaft into a nacelle mounted atop a tall tower. The nacelle can house a transmission to increase a rotational speed of the rotor shaft to a desired speed for an electrical generator. For example, the transmission can include a gearbox that transmits the slower rotation of the blades and rotor shaft into a quicker rotation that is more suitable to drive the electrical generator. Some means of power smoothing can also be provided to compensate for cyclic fluctuation and wind gusts that change the speed of the rotor shaft. Smaller wind turbines can be oriented to prevailing winds by a simple wind vane, while large turbines generally use a wind sensor coupled with a yaw system. With the yaw system, the nacelle can be configured to turn in a horizontal plane so that the rotor hub and blades can adjust to a wind direction and optimally face the rotor into the prevailing wind. As of 2019, an average-sized wind turbine unit (1.5 MW) can have a supporting structure, usually a tower, 80 meters high, which supports the horizontal-axis rotor, hub, and nacelle, the nacelle housing the transmission and electric generator that converts rotary motion of the rotor shaft to electrical current. A typical nacelle for this type of unit can weigh about 115,000 pounds, which is positioned atop the supporting structure or tower.

Horizontal axis wind turbines are not without their problems, however. Various components in the nacelle, including the transmission, can require regular maintenance intervals, which such routine maintenance and unexpected repairs can present a major expense in horizontal axis wind turbine operation. What is more, additional expenses are incurred in design and reinforcement of the tower structure supporting the heavy nacelle. Any maintenance of the components within the nacelle can require specialized service conditions, where the very nature of the structure presents unique workplace obstacles due to height, weather exposure, and the space and safety constraints involved for personnel in accessing, manipulating, and removing and replacing worn or damaged parts.

Accordingly, there is a need for a horizontal axis wind turbine that minimizes design, construction, installation, maintenance, and repair costs while maximizing safety and access to serviceable components of the wind turbine.

SUMMARY

The present technology includes articles of manufacture, systems, and processes that relate to a horizontal axis wind turbine that transfers wind power to an electrical generator positioned at or near the base of the wind turbine tower, facilitating maintenance of the electrical generator and reducing the weight support requirement of the tower.

Horizontal axis wind turbines are provided that include a rotor, a first rotatable member, a tower, a second rotatable member, an endless member, and an electrical generator. The rotor includes a hub having at least one blade extending therefrom. The first rotatable member is coupled to the rotor and is configured to rotate in relation to wind-induced rotation of the rotor. The tower supports the rotor and has a base. The second rotatable member is spaced from the first rotatable member toward the base of the tower. The endless member engages the first rotatable member and the second rotatable member, where the endless member is configured to convey a rotational force between the first rotatable member and the second rotatable member. The electrical generator is coupled to the second rotatable member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides horizontal axis wind turbines where installation, capital costs, and serviceability are improved and tower load requirements are reduced in comparison to known turbines. Although horizontal axis wind turbines and electrical generators are widely deployed across the Earth, designs of such wind turbines typically mount the electrical generator in a nacelle atop the supporting structure, usually a tower. Vertical axis wind turbines with electrical generators located on the ground are known, but operate in a different manner and are less efficient compared to horizontal axis wind turbines. The horizontal axis wind turbines provided herein allow for considerable cost savings during installation, saving many tons of concrete and steel in the base or foundation, in part due to the lower support weight requirements of the tower structure, as the electrical generator is not located at or proximate the top of the tower. Other advantages include material and cost savings for the support structure or tower itself, as it is not required to support as much weight. Material and cost savings are also realized for other critical components, such as bearings, because such components also support less weight. Lower operating and maintenance costs are possible, as the necessary lubrication, repair, and replacement of the majority of the components of the horizontal axis wind turbine can take place on the ground, instead of tens of meters or even over a hundred meters in the air. The present turbines can obviate the need for equipment, such as cranes, in accessing components of the turbine. Likewise, the present turbines provide a higher degree of safety, where assembly and installation of heavy and large components, including the electrical generator, are easier and safer on the ground rather than over a hundred meters in the air, for example.

Horizontal axis wind turbines, ways of manufacturing such turbines, and uses of such turbines can employ a rotor including a hub having at least one blade extending therefrom. A first rotatable member can be coupled to the rotor and can be configured to rotate in relation to wind-induced rotation of the rotor. A tower can support the rotor and can have a base. A second rotatable member can be spaced from the first rotatable member toward the base of the tower. An endless member can engage the first rotatable member and the second rotatable member, where the endless member can be configured to convey a rotational force between the first rotatable member and the second rotatable member. An electrical generator can be coupled to the second rotatable member, thereby allowing rotational mechanical energy to be converted to electrical power.

The rotor can have a hub with one or more blades extending therefrom. Certain embodiments include a hub having three blades extending therefrom. However, embodiments can include hubs having from one blade to many dozens of blades. The blades can be arranged on the hub in a balanced fashion by using weight, spacing, and geometric considerations to minimize periodic forces and torques to the rotor and ensure the hub rotates smoothly and with minimal vibration.

The first rotatable member can be mechanically coupled to the rotor in various ways. In certain embodiments, for example, the first rotatable member can be directly coupled to the rotor. One example includes having the first rotatable member configured like a pulley and the rotor configured like an axle or shaft therethrough in a fixed relationship, where rotation of the rotor rotates the first rotatable member. A diameter of the first rotatable member relative to a rotational axis thereof can be larger than a diameter of the rotor relative to a rotational axis thereof. In this way, for example, the first rotatable member can provide increased engagement and translation of the endless member as compared to where the diameter of the first rotatable member is the same as the diameter of the rotor. The first rotatable member can also be mechanically coupled to the rotor so that the first rotatable member and the rotor rotate at different speeds. Examples include where the first rotatable member is mechanically coupled to the rotor through a gearbox or gear train such as a single stage gear reducer or planetary gear so that the first rotatable member rotates at a faster or slower speed than the rotor.

The tower of the horizontal wind axis turbine can be configured in various ways. Towers can take the form of tubular structures, lattice structures, and combinations thereof. Generally, the tower comprises an elongate member having a longitudinal axis, where the tower can support the rotor proximate one end of the elongate member, and the base can be located proximate the other end of the elongate member. Tower height can depend on installation location and blade size, as well as expected prevailing winds and translation thereof into electrical power. Height of the tower can range from several meters (e.g., installation on a rooftop) to tens of meters or over one hundred meters (e.g., installation on the ground or in a body of water). Examples further include tubular steel towers for multi megawatt turbines having heights of 70 m to 120 m, and in certain instances up to 160 m.

There are various ways to have the endless member engage the first rotatable member and the second rotatable member so that the endless member can convey a rotational force between the first rotatable member and the second rotatable member. Certain embodiments include where the first rotatable member and the second rotatable member are configured as pulleys and the endless member comprises one of a belt and a cable. For example, each pulley can have a groove or grooves between flanges around its circumference to locate the belt or the cable. The endless member or drive element of the pulley system can be one or more belts, cables, or chains. In certain embodiments, the first rotatable member and the second rotatable member are configured as sprockets and the endless member comprises a chain. As noted, the first rotatable member can be coupled to the rotor in various ways so that the first rotatable member can rotate in relation to wind-induced rotation of the rotor. Various structures and bearings can be used to support the first rotatable member in relation to the rotor and/or the tower supporting the rotor. Likewise, the second rotatable member can be supported by various structures and bearings on the ground and/or with respect to the tower, including where the second rotatable member is supported by the tower proximate to the base thereof.

The electrical generator can be coupled to the second rotatable member in various ways. For example, the electrical generator can be mechanically coupled to the second rotatable member through a gearbox or gear train such as a single stage gear reducer or planetary gear so that an input shaft to the electrical generator rotates at a faster or slower speed than the second rotatable member. Certain embodiments include where a transmission couples the second rotatable member to the electric generator, where the transmission is configured to rotate the second rotatable member and the input shaft of the electrical generator at different speeds. The transmission can be configured to provide one or more discrete transmission ratios or a range of continuously variable transmission ratios in order to maintain a desired rotational speed of the input shaft of the electrical generator in response to changing wind speeds being translated to the second rotatable member. The transmission can also include a brake and/or can be configured to disengage the mechanical coupling between the electrical generator and the second rotatable member. Other examples include where the transmission can include a clutch, and ratchet and pawl as a means for disengagement. As noted herein, certain advantages result from not placing the electrical generator atop the tower and/or by having the tower not support the electrical generator. The electrical generator can accordingly be located on the ground or a surface of a support structure of the horizontal axis wind turbine, which can include placing the electrical generator proximate the base of the tower. The electrical generator can be placed adjacent or within the tower structure; e.g., where the tower takes the form of a tubular structure, the electrical generator can be placed adjacent to or inside the tubular structure at the base of the tower.

The tower of the horizontal axis wind turbine can include the following aspects. The base of the tower can be affixed to various features, structures, and surfaces. In certain embodiments, the base of the tower is affixed to a surface, where the surface can be configured to rotate the tower, thereby allowing the rotor to point in a desired direction. The electrical generator can also be supported by the surface, thereby allowing the tower and electrical generator to be optimally oriented depending on prevailing wind direction. The surface can be part of a foundation, including a steel and/or concrete foundation. Other embodiments include where the surface is part of a buoyant structure allowing the horizontal axis wind turbine to be positioned on a body of water.

Various portions of the horizontal axis wind turbine can be enclosed by various housings for durability, streamlining, and protective purposes. Examples include where a first housing encloses the first rotatable member, the first housing configured as a nacelle, and/or where a second housing encloses the second rotatable member. Certain embodiments include where the tower itself encloses the first rotatable member, the second rotatable member, and the endless member. The electrical generator can be enclosed by various housings, its own separate housing, or where the tower further functions as a housing to enclose the electrical generator.

Particular embodiments of the present technology include horizontal axis wind turbines having a rotor including a hub with a plurality of blades extending therefrom. A first rotatable member is coupled to the rotor and is configured to rotate in relation to wind-induced rotation of the rotor. A tower supports the rotor and has a base affixed to a surface, where the surface is configured to rotate the tower, thereby allowing the rotor to point in a desired direction. A second rotatable member is spaced from the first rotatable member toward the base of the tower. An endless member engages the first rotatable member and the second rotatable member, where the endless member is configured to convey a rotational force between the first rotatable member and the second rotatable member. An electrical generator is coupled to the second rotatable member by a transmission, where the transmission is configured to rotate the second rotatable member and an input shaft of the electrical generator at different speeds. The electrical generator is proximate the base of the tower and supported by the surface.

Still further embodiments of the present technology include wind-powered electrical generators including a base, a supporting structure or tower, and a horizontal-axis wind-powered rotor. Two pulleys or sheaves are provided, where one is mounted at or near the upper part of the supporting structure and the other is mounted at or near the lower part of the supporting structure. A connecting drive belt is disposed about the pulleys or sheaves in order to mechanically translate rotation therebetween. An electric generator is mounted on a base of the tower or on the ground. The base is stationary on or in the ground, the supporting structure is mounted to the base, and the horizontal-axis rotor is mounted at the top of the supporting structure. The upper pulley is mechanically coupled to the rotor, the cable or belt is powered by the rotation of the upper pulley, the cable or belt drives the other, lower pulley which is at or near the bottom of the supporting structure or tower. The lower pulley is mechanically coupled to the shaft of the electric generator, which is thereby driven by rotary motion of the shaft. The connecting drive belt transfers rotational motion from the rotor and pulley at the top of the supporting structure to the pulley and generator at the bottom, allowing the generator to be mounted on the ground.

EXAMPLES

Example embodiments of the present technology are provided with reference to the several figures enclosed herewith.

Figure 1:
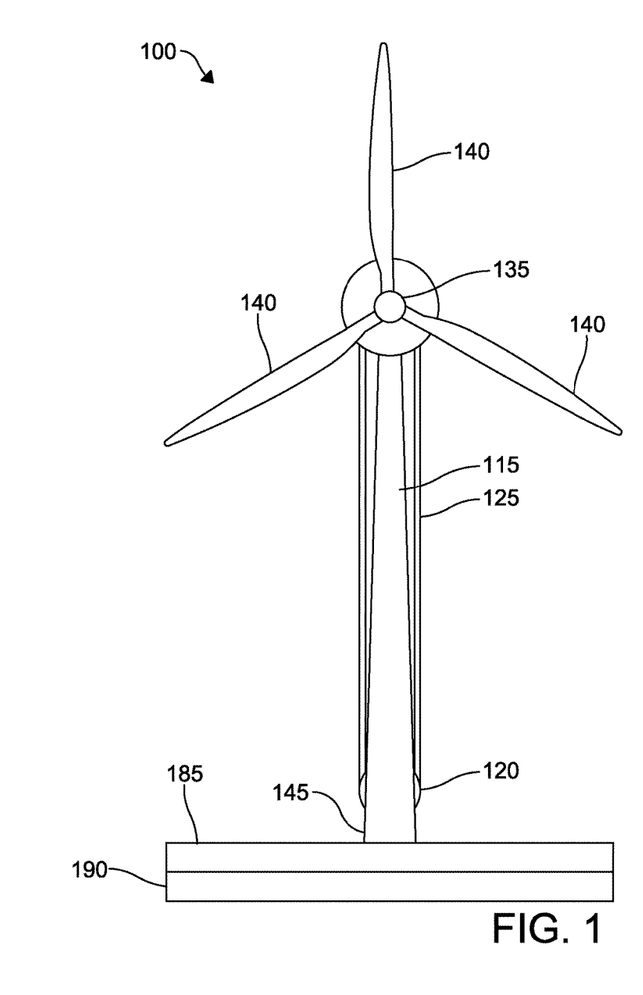
FIG. 1 is a front elevational view of a horizontal axis wind turbine positioned on a rotatable platform constructed in accordance with the present technology.
Figure 2:
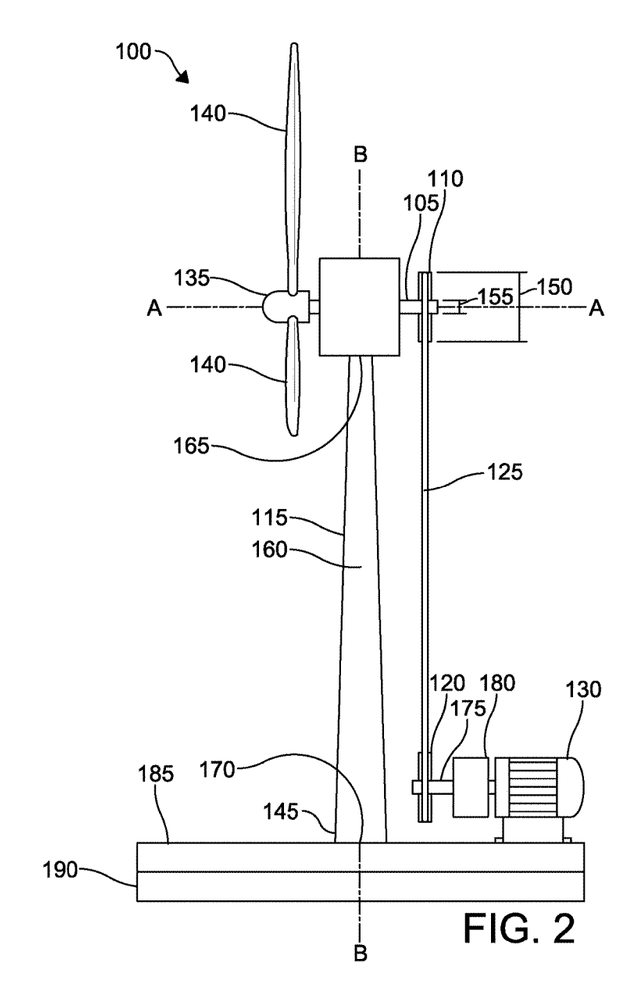
FIG. 2 is a side elevational view of the horizontal axis wind turbine of FIG. 1.

With reference to FIGS. 1 and 2, front and side elevational views of an embodiment of a horizontal axis wind turbine 100 are shown. The horizontal axis wind turbine 100 includes a rotor 105, a first rotatable member 110, a tower 115, a second rotatable member 120, an endless member 125, and an electrical generator 130. The rotor 105 has a hub 135 with three blades 140 extending therefrom. The first rotatable member 110 is coupled to the rotor 105 and configured to rotate in relation to wind-induced rotation of the rotor 105. The tower 115 supports the rotor 105 and has a base 145. The second rotatable member 120 is spaced from the first rotatable member 110 toward the base 145 of the tower 115. The endless member 125 engages the first rotatable member 110 and the second rotatable member 120, where the endless member 125 is configured to convey a rotational force between the first rotatable member 110 and the second rotatable member 120. The electrical generator 130 is coupled to the second rotatable member 120.

In the embodiment of the horizontal axis wind turbine 100 depicted, the hub 135 has three blades 140 extending therefrom, but it should be recognized that other numbers of blades 140 can be used. Likewise, the first rotatable member 110 is shown is directly coupled to the rotor 105 and a diameter 150 of the first rotatable member 110 relative to a rotational axis A thereof is larger than a diameter 155 of the rotor 105 relative to a rotational axis A thereof. However, it is understood that the first rotatable member 110 can be mechanically coupled to the rotor 105 so that the first rotatable member 110 and the rotor 105 rotate at different speeds. The tower 115 is formed as an elongate member 160 having a longitudinal axis B, where the tower 115 supports the rotor 105 proximate one end 165 of the elongate member 160 and the base 145 is proximate the other end 170 of the elongate member 160.

For the depicted embodiment of the horizontal axis wind turbine 100, the first rotatable member 110 and the second rotatable member 120 are configured as pulleys and the endless member 125 can take the form a belt or a cable. However, it is understood that the first rotatable member 110 and the second rotatable member 120 can be configured as sprockets and that the endless member 125 can accordingly be configured as a chain that engages teeth of the sprockets. The second rotatable member 120 in the embodiment depicted in FIGS. 1 and 2 is not supported by the tower 115 proximate to the base 145, but is instead shown coupled to and/or supported by an input shaft 175 of the electrical generator 130. However, it is also possible to have the input shaft 175, with the second rotatable member 120 coupled thereto, be supported by the tower 115, such as where the rotor 105 is supported by the tower 115. For example, one or more bearings (not shown) can be used to support the rotor 104 and the input shaft 175 relative to the tower 115.

A transmission 180 is shown intermediate the electrical generator 130 and the second rotatable member 120, where the transmission 180 couples rotation of the second rotatable member 120 to the electric generator 130. The transmission 180 can be configured to rotate the second rotatable member 120 and the input shaft 175 of the electrical generator 130 at different speeds. As depicted in the figures, the electrical generator 130 is located proximate the base 145 of the tower 115. However, the electrical generator 130 can be offset to varying degrees depending on a desired location of the electrical generator 130 by adjusting a length of the endless member 125 relative to the first rotatable member 110 and the second rotatable member 120, further accounting for space considerations at a particular installation location for the horizontal axis wind turbine 100 or a desired configuration.

The base 145 of the tower 115 of the horizontal axis wind turbine 100 shown is affixed to and supported by a surface 185, where the surface 185 can be configured to rotate the tower 115, thereby allowing the rotor 105 to point in a desired direction. In this way, for example, the horizontal axis wind turbine 100 can be optimally directed with respect to prevailing winds. In particular, the surface 185 can rotate with respect to a foundation 190 designed to support the horizontal axis wind turbine 100 on or within various types of ground, including earth, sand, rock, etc. The foundation 190 can include steel and/or concrete structures designed to stabilize and anchor the horizontal axis wind turbine 100 against maximum expected atmospheric and/or geologic forces at particular location. In should be appreciated that in certain instances the surface 185 and/or the accompanying foundation 190 can be configured as a buoyant structure to permit the horizontal axis wind turbine 100 to be installed within or on a body of water.

Figure 3:
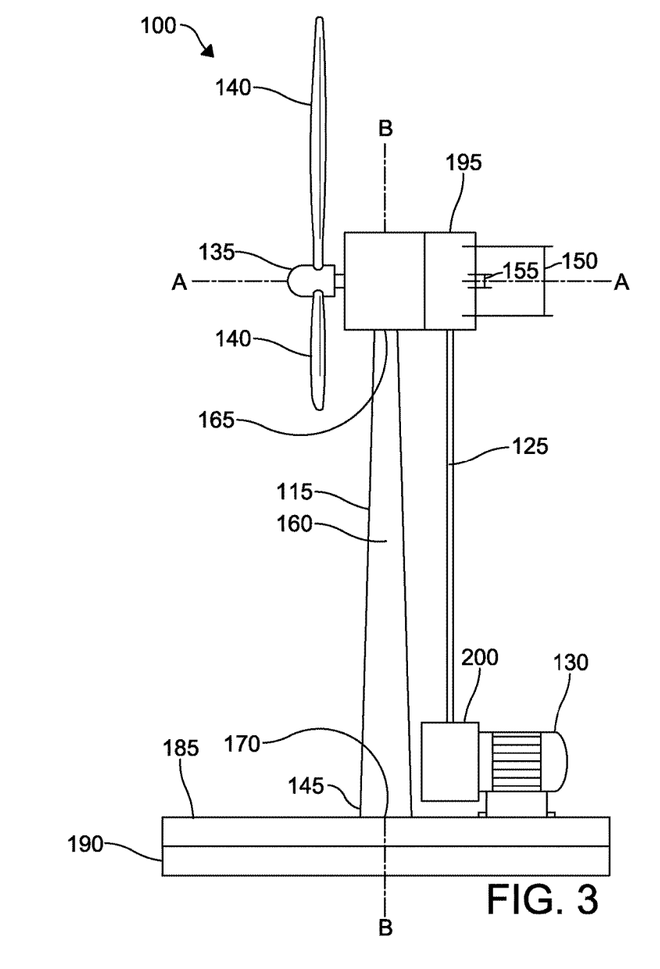
FIG. 3 is a side elevational view of the horizontal axis wind turbine of FIG. 1 with nacelle and base housings installed.

With reference to FIG. 3, a side elevational view of the embodiment of the horizontal axis wind turbine 100 of FIG. 1 is shown with nacelle and base housings installed. In particular, a first housing 195 encloses the first rotatable member 110, where the first housing 195 is configured as a nacelle. A second housing 200 encloses the second rotatable member 120.

Figure 4:
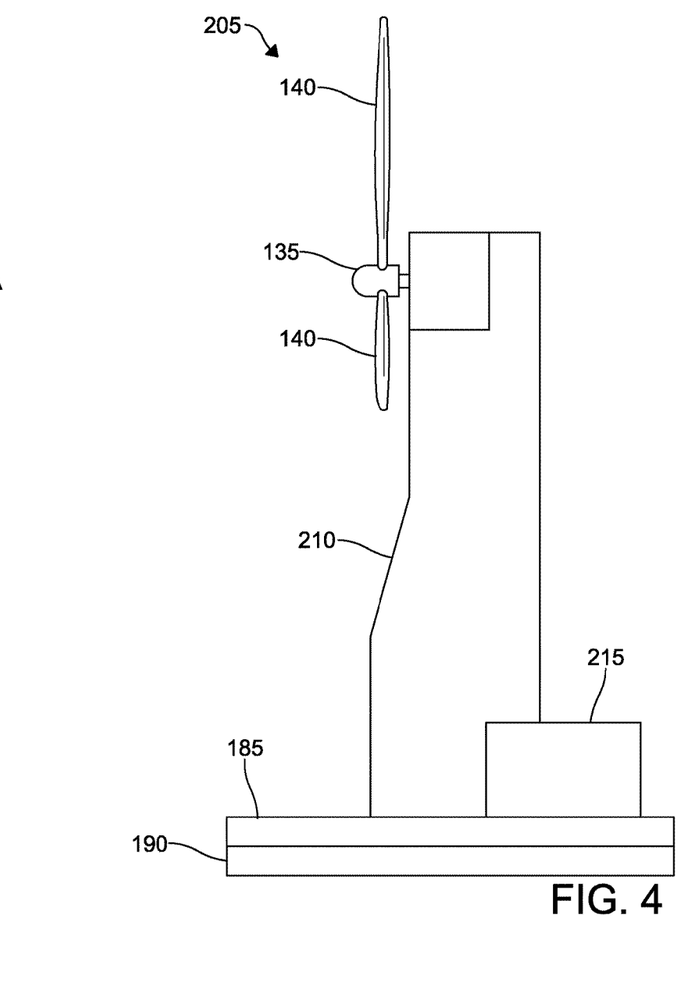
FIG. 4 is a side elevational view of another embodiment of a horizontal axis wind turbine where the tower houses several working components of the turbine.

With reference to FIG. 4, a side elevational view of another embodiment of the horizontal axis wind turbine 205 is shown. In this embodiment, the tower 210 is configured to house several working components of the horizontal axis wind turbine 205, including the first rotatable member 110, the second rotatable member 120, and the endless member 125. The tower 205 can also be configured to house the electrical generator 130. However, in the embodiment depicted in FIG. 4, a separate housing 215 is used to enclose the electrical generator 130.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A horizontal axis wind turbine comprising:
    a rotor including a hub having at least one blade extending therefrom;
    a first rotatable member coupled to the rotor and configured to rotate in relation to wind-induced rotation of the rotor;
    a tower connected to and supporting the rotor and having a base;
    a second rotatable member spaced from the first rotatable member toward the base of the tower;
    an endless member engaging the first rotatable member and the second rotatable member, the endless member configured to convey a rotational force between the first rotatable member and the second rotatable member; and
    an electrical generator coupled to the second rotatable member;
    a first housing enclosing the first rotatable member and configured only to protect the first rotatable member from the elements; and
    a second housing enclosing the second rotatable member and the electrical generator and configured only to protect the second rotatable member and the electrical generator from the elements;
    wherein the second housing is spaced apart from the first housing.

2. The horizontal axis wind turbine of claim 1, wherein the hub has three blades extending therefrom.

3. The horizontal axis wind turbine of claim 1, wherein the first rotatable member is directly coupled to the rotor.

4. The horizontal axis wind turbine of claim 1, wherein a diameter of the first rotatable member relative to a rotational axis thereof is larger than a diameter of the rotor relative to a rotational axis thereof.

5. The horizontal axis wind turbine of claim 1, wherein the first rotatable member is mechanically coupled to the rotor so that the first rotatable member and the rotor rotate at different speeds.

6. The horizontal axis wind turbine of claim 1, wherein the tower comprises an elongate member having a longitudinal axis, the tower supporting the rotor proximate one end of the elongate member, the base proximate the other end of the elongate member.

7. The horizontal axis wind turbine of claim 1, wherein the first rotatable member and the second rotatable member are configured as pulleys and the endless member comprises one of a belt or a cable.

8. The horizontal axis wind turbine of claim 1, wherein the first rotatable member and the second rotatable member are configured as sprockets and the endless member comprises a chain.

9. The horizontal axis wind turbine of claim 1, wherein the second rotatable member is supported by the tower proximate to the base.

10. The horizontal axis wind turbine of claim 1, wherein a transmission couples the second rotatable member to the electric generator, the transmission configured to rotate the second rotatable member and an input shaft of the electrical generator at different speeds.

11. The horizontal axis wind turbine of claim 1, wherein the electrical generator is located proximate the base of the tower.

12. The horizontal axis wind turbine of claim 1, wherein the base of the tower is affixed to a surface.

13. The horizontal axis wind turbine of claim 12, wherein the electrical generator is supported by the surface.

14. The horizontal axis wind turbine of claim 12, wherein the surface comprises a foundation.

15. The horizontal axis wind turbine of claim 14, wherein the foundation comprises a member selected from the group consisting of steel, concrete, and combinations thereof.

16. The horizontal axis wind turbine of claim 1, wherein the tower encloses the endless member.

17. A horizontal axis wind turbine comprising:
- a rotor including a hub having a plurality of blades extending therefrom;
- a first rotatable member coupled to the rotor and configured to rotate in relation to wind-induced rotation of the rotor;
- a tower connected to and supporting the rotor and having a base affixed to a surface, the surface configured to rotate the tower, thereby allowing the rotor to point in a desired direction;
- a second rotatable member spaced from the first rotatable member toward the base of the tower;
- an endless member engaging the first rotatable member and the second rotatable member, the endless member configured to convey a rotational force between the first rotatable member and the second rotatable member; and
- an electrical generator coupled to the second rotatable member by a transmission, the transmission configured to rotate the second rotatable member and an input shaft of the electrical generator at different speeds, the electrical generator proximate the base of the tower and supported by the surface;
- a first housing enclosing the first rotatable member and configured only to protect the first rotatable member from the elements; and
- a second housing enclosing the second rotatable member and the electrical generator and configured only to protect the second rotatable member and the electrical generator from the elements;
- wherein the second housing is spaced from the first housing.

* * * * *

UNITED STATES PATENT AND TRADEMARK OFFICE
CERTIFICATE OF CORRECTION

PATENT NO. : 11,009,010 B1  
APPLICATION NO. : 16/854722  
DATED : May 18, 2021  
INVENTOR(S) : John A. Saavedra Page 1 of 1

It is certified that error appears in the above-identified patent and that said Letters Patent is hereby corrected as shown below:

In the Claims

Please correct Claim 17, Column 12, Line 17 to read as follows:
"wherein the second housing is spaced apart from the first"

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*